United States Patent [19]
Mullins

[11] Patent Number: 5,255,714
[45] Date of Patent: Oct. 26, 1993

[54] QUICK-ACTION FLUID COUPLING

[75] Inventor: Randall J. Mullins, Matthews, N.C.

[73] Assignee: Perfecting Services, Inc., Charlotte, N.C.

[21] Appl. No.: 975,822

[22] Filed: Nov. 13, 1992

[51] Int. Cl.$^5$ .............................................. F16L 37/28
[52] U.S. Cl. ................... 137/614.04; 285/316; 285/91
[58] Field of Search ............... 137/614, 614.02, 614.04; 285/316, 402, 91, 90

[56] References Cited

U.S. PATENT DOCUMENTS

| | | | |
|---|---|---|---|
| Re. 23,120 | 6/1949 | Earle et al. | 285/277 |
| 2,377,812 | 6/1945 | Scheiwer | 285/316 |
| 2,552,543 | 5/1951 | Earle et al. | 285/316 X |
| 2,690,918 | 10/1954 | Holte | 285/316 X |
| 3,023,030 | 2/1962 | Torres | 285/316 X |
| 3,039,794 | 6/1962 | Cenzo | 285/316 X |
| 3,083,042 | 3/1963 | Collar | 285/314 X |
| 3,100,655 | 8/1963 | Work | 285/316 X |
| 3,120,968 | 2/1964 | Calvin | 285/277 |
| 3,177,011 | 4/1965 | Ogne | 285/316 X |
| 3,196,897 | 7/1965 | Hodson | 285/316 X |
| 3,314,696 | 4/1967 | Ferguson et al. | 285/174 |
| 3,351,359 | 11/1967 | Ferraris | 285/314 X |
| 3,674,051 | 7/1972 | Stratman | 137/614.02 X |
| 3,761,117 | 9/1973 | Shendure | 285/316 X |
| 4,114,853 | 9/1978 | Medvick | 251/149.6 |
| 4,350,321 | 9/1982 | Berg | 285/316 X |
| 4,543,993 | 10/1985 | Calvin et al. | 137/614.03 |
| 4,546,956 | 10/1985 | Moberg | 251/149.6 |
| 4,582,347 | 4/1986 | Wilcox et al. | 285/316 X |
| 4,776,614 | 10/1988 | Marrison et al. | 285/316 X |
| 4,865,292 | 9/1989 | Ekman | 251/149.6 |
| 4,988,129 | 1/1991 | Saito et al. | 285/316 X |
| 5,092,364 | 3/1992 | Mullins | 137/614.05 |
| 5,116,086 | 5/1992 | Psajd | 285/315 X |

Primary Examiner—Martin P. Schwadron
Assistant Examiner—Kevin L. Lee
Attorney, Agent, or Firm—Bell, Seltzer, Park & Gibson

[57] ABSTRACT

A push-to-connect, pull-to-disconnect ball detent coupling operable with one hand has a socket, a plug, detent balls carried by the socket for holding the plug in coaxial coupled relation, and spring-biased sleeves on the socket and on the plug. The socket sleeve spring is located in an annular passageway between the sleeve and the socket on the side of the detent balls opposite the coupling end of the socket. The plug sleeve spring is located in an annular passageway between the sleeve and the plug on the side of the detent retaining means opposite the coupling end of the plug. During coupling movement, the outer terminal end of the plug sleeve engages the outer terminal end of the socket sleeve to move the socket sleeve to actuate the detent balls. To release the plug from the socket, an operator pushes either the socket sleeve or the plug sleeve against the plug sleeve spring so that an annular groove on the inner surface of the socket sleeve comes into registry with the ball retaining apertures thereby releasing the balls from the annular groove in the plug. The coupling is compact and suitable for use in the areas of limited access.

27 Claims, 3 Drawing Sheets fig.5.

QUICK-ACTION FLUID COUPLING

FIELD OF THE INVENTION

The invention claimed herein relates to couplings for quickly joining or separating fluid conducting lines. More particularly, this invention relates to quick-action couplings for use in high pressure hydraulic fluid power systems for jacks, tools for applying torque, and other hydraulic tools and machinery.

BACKGROUND OF THE INVENTION

Hydraulic fluid power systems are used to operate a variety of machinery. Hydraulic systems transmit and control power for operating machinery by forcing water, oil, or other liquid under pressure through an enclosed circuit of fluid conducting lines. Hydraulic jacks, tools for applying torque, and other hydraulic tools and machinery may be operated at high fluid pressures, typically in the neighborhood of 10,000 psi.

Fluid couplings for the hydraulic lines supplying power to tools and machinery typically comprise two primary components, or members: a generally cylindrical socket having an axial fluid flow passage that is attached to one hydraulic line and a generally cylindrical plug also having an axial fluid flow passage that is attached to the other. The plug is inserted into the socket to join the two lines and to create a single fluid flow passage between the lines. The coupling may be freestanding or the plug or the socket may be mounted in a manifold or wall or otherwise secured within the tool or machinery.

For many years, the socket and plug for couplings typically used in high pressure hydraulic tools and machinery have been secured in coaxial coupled relation by means of a cylindrical threaded sleeve that is threadedly fixed to the socket. The mating plug is provided with mating threads so that when the plug and socket are coupled, the operator secures the coupling by screwing the sleeve down onto the plug. The threaded sleeve provides a secure coupling, especially at high fluid pressures. However, securing the plug in this manner can be somewhat time consuming and the operator frequently must use tools. Also, tool and machinery operators sometimes wear heavy or bulky rubber gloves that become oily in use and reduce the dexterity with which the threaded sleeve can be manipulated.

Quick-action couplings sometimes are used as an alternative to couplings having threaded sleeves to more quickly join or separate fluid conducting lines without the use of tools or special equipment. Generally speaking, the quick-action socket has a plurality of evenly spaced locking balls contained in apertures that form a circle around the plug receiving end of the socket. A spring biased detent sleeve circumscribing the socket holds the locking balls radially inwardly. To insert the plug into the socket, the operator first uses one hand to pull the detent sleeve longitudinally away from the plug receiving end of the socket so that the balls are released. Using the other hand, the operator inserts the plug into the socket. The plug has an annular groove to receive the locking balls. The operator then releases the detent sleeve, which holds the balls in the annular groove in the plug and secures the plug in the socket. The operator removes the plug from the socket in an analogous fashion.

The quick-action couplings described above have several disadvantages that detract from their usefulness. For example, the operator pulls the sleeve against the bias of a spring so that the plug can be inserted into and withdrawn from the socket. The coupling requires the operator to use both hands to manipulate the detent sleeve and to insert the plug into the socket. Using both hands in this manner reduces the speed with which the socket and plug can be connected and disconnected. The problems caused by using both hands are compounded if the operator is wearing gloves or the coupling is installed in a relatively inaccessible portion of a tool or piece of machinery.

Quick-action couplings adapted for assembly and disassembly with one hand have been available in the past, but these couplings typically are not suitable for use in high pressure hydraulic equipment. For example, U.S. Pat. No. Re. 23,120 to C. E. Earle et al. and U.S. Pat. No. 2,377,812 to A. T. Scheiwer disclose such snap couplings. These patents both disclose a spring-biased detent-actuating sleeve carried by a socket. The mating plug engages a detent operator, or plunger, to bias the sleeve to actuate the detent. The detent operator is mounted on the socket with the sleeve for engagement by the plug. The diameter and length of such a fitting substantially limit its use in areas of confined space, such as the interior of a high pressure hydraulic tool.

It would be desirable to provide a quick-action hydraulic coupling that is compact and suitable for use in areas of limited access. Such a coupling should not require the operator to use one hand to pull back the detent sleeve while inserting the plug into the socket with the other hand. Such a coupling could be useful in high pressure hydraulic equipment where space is limited.

SUMMARY OF THE INVENTION

The invention claimed herein is of a quick-action fluid coupling having push-to-connect, pull-to-disconnect features that can be operated with one hand. The coupling can be installed in a high pressure fluid flow line and provides ease of coupling and uncoupling under conditions of limited or relatively inaccessible space, such as is found on the interior of hydraulic equipment.

In one embodiment, the coupling comprises a first member having a coupling end portion and a second member also having a coupling end portion for engaging the coupling end of the first member. The first and second members are generally cylindrical and have axial flow passages through them that define a single flow passage when the members are coupled in coaxial relation. The first member carries at least one detent for securing the second member in coaxial coupled relation with the first member, and the second member has a means for engaging the detent when the first and second members are in coaxial coupled engagement.

The first member also carries a first sleeve that is longitudinally movable for alternately maintaining the detent in, and releasing the detent from, securing engagement with the second member. The first sleeve is longitudinally biased toward the coupling end portion of the first member by a first biasing means.

The second member carries a second sleeve that is longitudinally movable for engaging the first sleeve. The second sleeve is longitudinally biased toward the coupling end portion of the second member by a second biasing means. When the second member is engaged with the first member in coaxial coupled relation, the second sleeve urges the first sleeve to hold the detent in engagement with the engaging means on the second member and secures the first and second members in coaxial coupled relation.

The first sleeve is manually movable against the second biasing means to release the detent from the engaging means on the second member so that the second member can be released from coaxial coupled relation with the first member.

In a more specific embodiment, the first member is a socket, the second member is a plug, and the detent comprises a plurality of ball detents. The socket has a plurality of apertures for holding the ball detents. The ball detents are movable radially inwardly and outwardly for insertion of the plug into and removal of the plug from the socket and for coupling engagement of the plug and socket.

The first sleeve is the socket sleeve and maintains the ball detents in and releases the ball detents from engagement with an annular groove on the plug. The socket sleeve has an annular groove for engaging the ball detents in a radially outward position and an adjacent projecting shoulder for engaging the ball detents in a radially inward position. The socket sleeve is spring biased against the socket so that when the socket and plug are not coupled then the annular groove is brought into registry with the ball retaining apertures and the balls are free to move radially outwardly.

The second sleeve is the plug sleeve and engages the socket sleeve to urge the socket sleeve to hold the ball detents in engagement with the annular groove on the plug. The socket sleeve and plug sleeve biasing means are helical compression springs located in annular passages between the socket and socket sleeve and the plug and plug sleeve, respectively. The plug sleeve spring is stronger than the socket sleeve spring to bias the socket sleeve to hold the ball detents in engagement with the annular groove on the plug. The plug spring sleeve is confined on the side of the annular groove on the plug opposite the coupling end portion of the plug. The socket sleeve spring is confined on the side of the ball detents in the socket sleeve opposite the plug receiving end portion of the socket.

When the plug is inserted into the socket, the plug engages the balls to urge them radially outwardly into the annular groove on the socket sleeve and to hold the socket sleeve in place. The plug sleeve also engages the socket sleeve to compress the relatively stronger plug sleeve spring. On further insertion of the plug into the socket, the balls engage an annular groove on the plug and release the socket sleeve. The socket sleeve is then biased under the tension of the relatively stronger plug sleeve spring to snap longitudinally away from the plug receiving end portion of the socket and to bring the projecting shoulder on the inner surface of the socket sleeve into register with the ball retaining apertures. The projecting shoulder holds the balls in place in the annular groove on the plug thereby locking the plug and socket in coupling engagement.

To release the plug the operator simply pushes on the socket sleeve or plug sleeve, or both, against the bias of the plug sleeve spring to move the annular groove on the socket sleeve in register with the ball retaining apertures to release the balls from the plug and to eject the plug from the socket.

BRIEF DESCRIPTION OF THE DRAWINGS

FIGS. 5 through 12 illustrate in sequence the engagement and disengagement of the socket and plug of FIG. 1, as follows:

Corresponding reference characters indicate corresponding parts throughout the several views of the drawings.

DESCRIPTION OF THE PREFERRED EMBODIMENTS

The coupling of the invention can best be understood with reference to the specific embodiments that are illustrated in the drawings.

Figure 1:
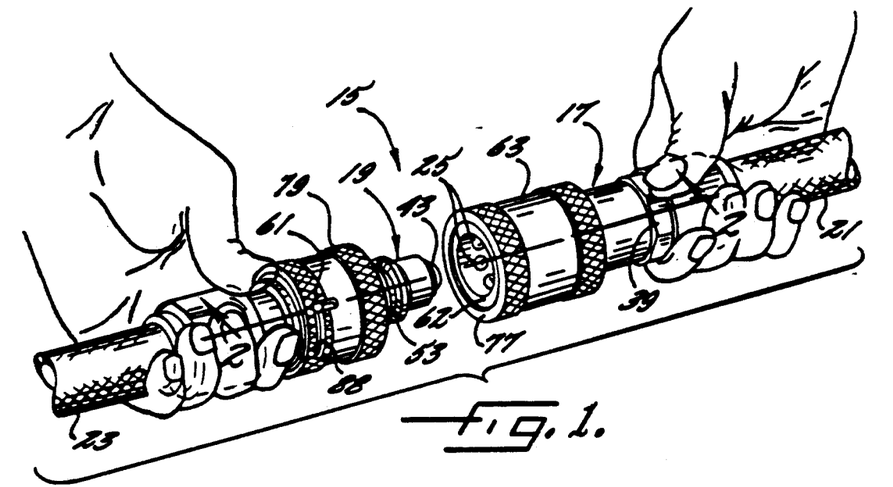
FIG. 1 illustrates in perspective a representative coupling of the present invention having the plug positioned for insertion into the socket for coupling engagement.

FIG. 1 shows a coupling of the invention claimed herein designated at 15 having a first member shown as a socket 17 and a second member shown as a mating plug 19 positioned for insertion into the socket. The socket and plug are coupled to form an internal fluid flow passage between a line 21 that is attached to the socket and another line 23 that is attached to the plug.

The plug is shown held in one hand of an operator and the socket is shown held in the other for the purpose of illustrating how the socket and plug may be coupled and then uncoupled. However, it should be understood that the invention claimed herein, and the embodiments of a coupling described hereinbelow and as shown in the drawings, may be operated with one hand. One of the components may be mounted in a manifold or wall of a tool or other machinery, analogous to one hand of an operator as shown in the drawings, in which event the cooperating component may be inserted and removed with one hand, as is explained in detail hereinbelow.

Figure 4:
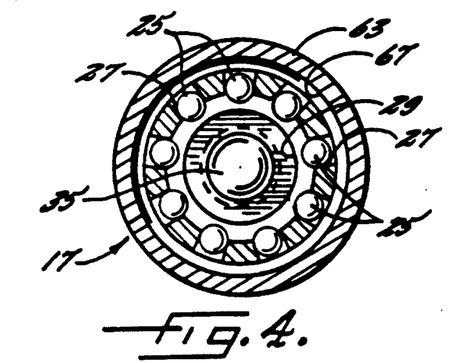
FIG. 4 is a transverse sectional view through the socket taken along line 4—4 of FIG. 2.

The plug and socket are connected in coupled relation by a plurality of ball detents 25 in ball retaining apertures 27 (FIGS. 2 and 4) along the circumference of the socket. The ball retaining apertures are tapered toward the flow passage so that the balls are movable radially inwardly to the limit of the taper and are freely moveable radially outwardly with respect to the plug.

Figure 2:
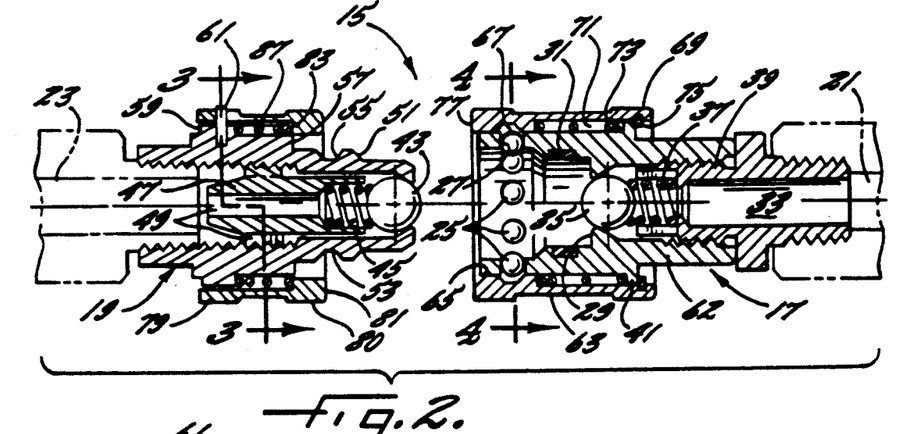
FIG. 2 is a view similar to FIG. 1 in which the plug and socket are shown in longitudinal section.

Referring now to FIG. 2, the socket includes a counter bore 29 for receiving the mating plug. A seal 31 is carried in the counter bore to engage the plug on insertion of the plug into the socket substantially to prevent fluid leakage from the flow passage when the plug and socket are coupled.

The flow passage 33 of the socket contains a stainless steel ball valve 35 (also shown in FIG. 4) that is biased to close the flow passage in the socket when the fittings are disconnected. The ball valve is biased by a helical compression spring 37 that is carried by a threaded end fitting 39 to engage the side wall of flow passage 33 when the fittings are disconnected.

Socket 17 also includes an annular flange 41 for a purpose to be explained later.

Figure 3:
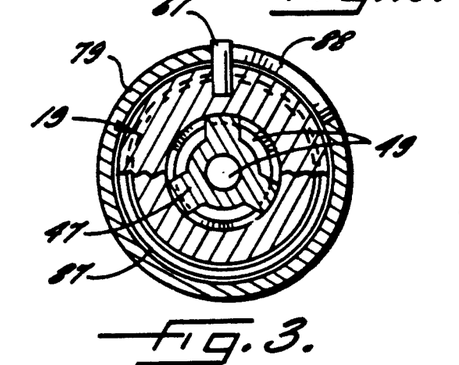
FIG. 3 is a transverse sectional through the plug taken along line 3—3 of FIG. 2.

The mating plug 19 has a ball valve 43 biased by a helical compression spring 45 that correspond, respectively, to the ball valve and helical compression spring of the socket 17. Spring 45 is supported by a spider 47 (FIG. 3) in plug fluid passageway 49 similar to the manner in which end fitting 39 supports spring 37 in the fluid passageway of the socket. Ball valve 43 is biased by the spring 45 to engage the side wall of passageway 49 to close the passageway when the plug and socket are disconnected.

Figures 8, 9, 10:
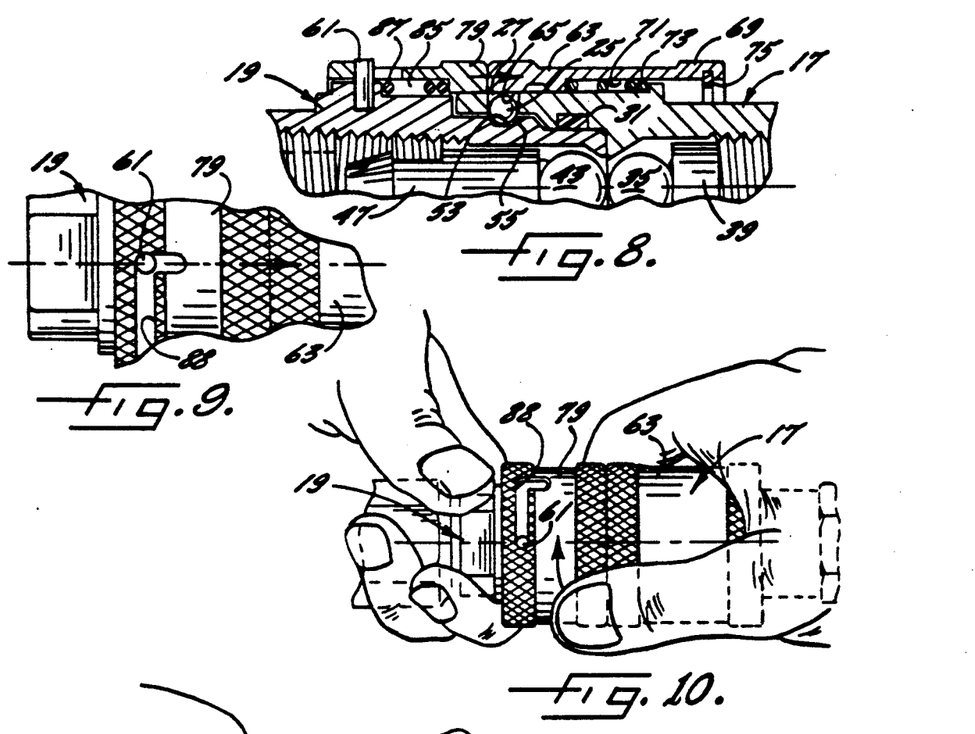
FIG. 8 is a partial longitudinal section through the fully assembled coupling of FIG. 1.
FIG. 9 is a partial side view of the fully assembled coupling of FIG. 8 and illustrates a safety lock lever for avoiding inadvertent disengagement of the plug and socket.
FIG. 10 is a side view of the fully assembled coupling of FIG. 8 and shows actuation of the safety lock lever of FIG. 9.

The ball valve 43 in the plug cooperates with ball valve 35 in the socket against the bias of springs 45 and 37, respectively, to open flow passages 49 and 33 to form a common flow passage when the plug and socket are coupled (FIG. 8).

The plug 19 includes a first annular ramp 51 that cammingly engages the ball detents 25 and urges them radially outwardly as the plug is inserted into the socket 17. An annular groove 53 is provided on the plug for receipt of the balls and provides a race by which the plug can engage the balls to secure the plug in coupled relation with the socket. The skilled artisan will recognize that for use at hydraulic fluid pressures near 10,000 psi, the race will need to be hardened and the plug made of high strength steel to withstand repeated deformation by the action of the ball detents on the race. Such hardening techniques are believed to be known to the skilled artisan and therefore are not otherwise described herein.

The plug also includes a second annular ramp 55 that forms one of the sidewalls of the annular groove 53 for cammingly engaging the balls and urging them radially outwardly when the plug is removed from the socket.

Annular shoulders 57 and 59 and safety locking lever 61 (also shown in FIG. 3) are also provided on the plug, the purposes of which are explained hereinbelow.

A first (socket) sleeve 63 circumscribes the plug receiving end portion 62 of the socket 17 and provides a means for holding the balls 25 in the annular groove 53 of the plug 19 for maintaining the plug and socket in coupled relation and for releasing the balls from the socket and from the plug to disconnect the plug and socket. The socket sleeve 63 has a projecting shoulder 65 that is shown in FIG. 8 in registry with the ball retaining apertures 27 and holding the balls in engagement with the annular groove 53 in the plug so that the plug and socket are fixed in coaxial coupled relation. Adjacent the projecting shoulder 65, the socket sleeve has an annular groove 67 for receiving the balls and for engaging the balls to hold the socket sleeve in place while the ramp 51 on the plug urges the balls radially outwardly as the plug is inserted into the socket. Flange 41 on the socket and a flange 69 on the socket sleeve 63 form the end points of a passage 71 between the socket and the socket sleeve. The passage contains a helical compression spring 73 that biases the sleeve against the flange 41 toward the plug receiving end of the socket so that when the plug and socket are disconnected, then the annular groove 67 in the socket sleeve is held in registry with the ball retaining apertures. As can be seen in FIG. 2, the socket sleeve spring 73 is confined on the side of the ball detents 25 opposite the plug receiving end of the socket. The socket sleeve is limited in further longitudinal movement in the direction of the plug receiving end of the socket by a snap ring 75 that engages flange 41.

The socket sleeve also has an annular abutment 77 at an outer terminal and thereof for a purpose to be explained hereinbelow.

A second (plug) sleeve 79 circumscribes the plug 19 and is longitudinally movable and biased toward the coupling end portion 80 of the plug to provide a means for engaging the socket sleeve to urge the socket sleeve to hold the ball detents in annular groove 53 when the plug and socket are in coaxial coupled relation. The plug sleeve has an annular abutment 81 at an outer terminal end thereof for engaging the annular end abutment 77 on the socket sleeve and urging the socket sleeve against the bias of spring 73 so that projecting shoulder 65 is held in registry with the ball retaining apertures 27. Projecting shoulder 83 on the plug sleeve and annular shoulder 59 on the plug form the end points of a passage 85 between the plug and plug sleeve. The passage contains helical compression spring 87 that biases the plug sleeve against the shoulder 59 toward the coupling end portion 80 of the plug. As can be seen in FIG. 2, the plug sleeve spring 87 is confined on the side of the annular groove 53 opposite the coupling end portion 80 of the plug. The plug sleeve is limited in further longitudinal movement in the direction of the coupling end portion 80 of the plug by safety lock lever 61 (also shown in FIG. 3), which extends from the plug body through a slot 88 in the plug sleeve.

The plug sleeve and socket sleeve may be sized so that the coupling has the same diameter as couplings of the type described in the background to the invention that are used in high pressure hydraulic lines for tools and machinery. In this manner, prior couplings may be replaced by the coupling of the claimed invention substantially without changes to the tool, machine, or manifolds used.

Figure 5:
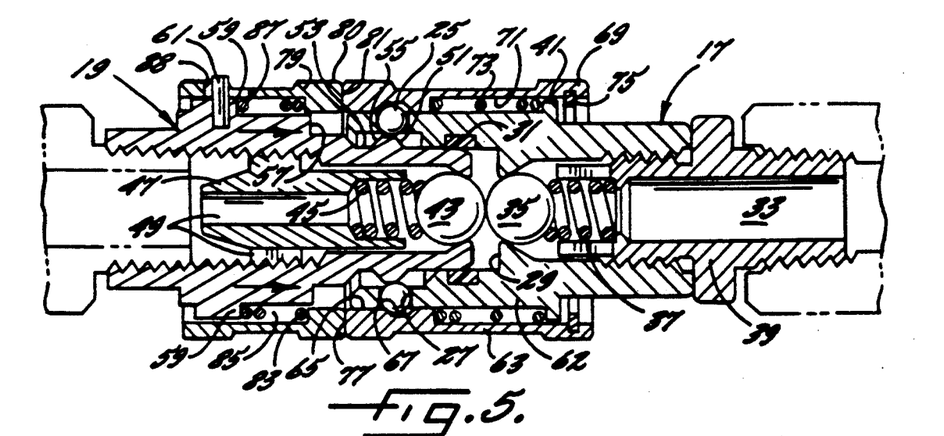
FIGS. 5 and 6 illustrate in sequence longitudinal sections of the plug of FIG. 1 being inserted into the socket of FIG. 1 for coupling engagement.
Figure 6:
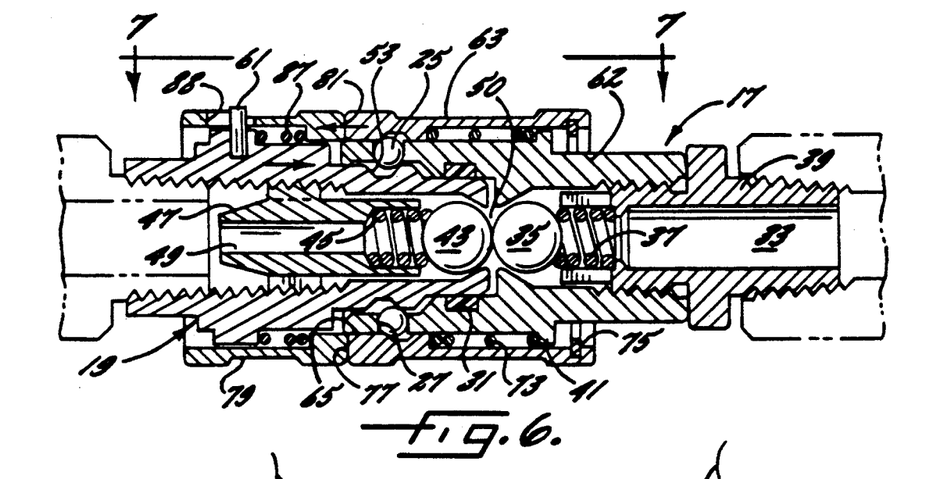

FIGS. 5 and 6 show how the components of the coupling cooperate as the plug is being inserted into the socket. FIG. 5 shows the plug 19 inserted into the socket 17 to the point where the ball valves 35 and 43 are engaged and the plug has engaged seal 31. Plug sleeve 79 has engaged socket sleeve 63 through cooperating abutments 81 and 77 on the outer terminal ends of the plug and socket sleeves, respectively. Ramp 51 has cammingly engaged ball detents 25 to urge the ball detents radially outwardly into annular groove 67 to hold the socket sleeve fast relative to the socket and against the plug sleeve. Ball detent 25 is shown at the top of its travel over ramp 51. Helical compression spring (plug spring) 87 is compressed as the plug sleeve is forced to travel longitudinally away from the coupling end of the plug.

FIG. 6 shows that as the plug is pushed further into the socket, springs 37 and 45 are compressed to open a fluid flow passage 50 common to flow passages 33 and 49, and seal 31 is fully engaged by plug body 19 substantially to preclude fluid leakage from the coupling. Ball detents 25 are shown just prior to the moment of entering into annular groove 53 on plug body 19. Plug spring 87 is compressed to its greatest extent. Plug spring 87 is stronger than socket sleeve spring 73, and so as soon as ball detents 25 drop into annular groove 53 on plug 19 the plug sleeve 79 urges the socket sleeve 17 longitudinally away from the plug receiving end. Projecting annular shoulder 65 comes into registry with ball retaining apertures 27 and engages the ball detents 25 in a radially inward position in annular groove 53 on the plug to secure the plug and socket in coaxial coupled relation.

Figure 7:
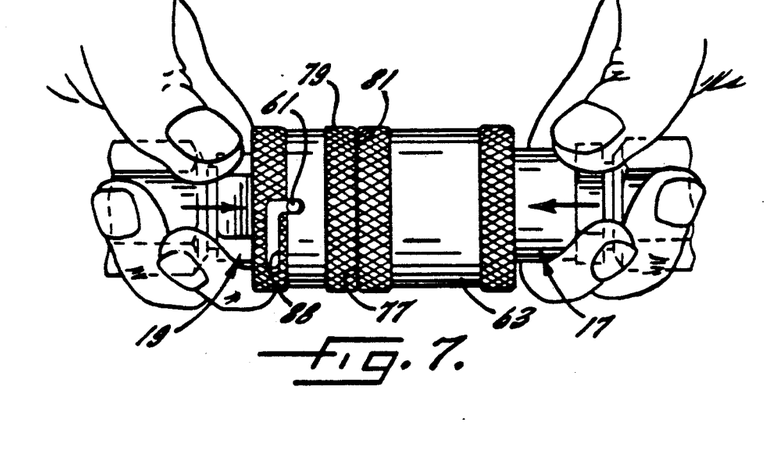
FIG. 7 is a side view of the coupling in the position shown in FIG. 6 in longitudinal section.

FIG. 7 shows a side view of the coupling of the claimed invention with the components in the same relation as in FIG. 6. Slot 88 in plug sleeve 79 has a longitudinal portion that extends in the same direction as the axial fluid flow passage of the plug and a portion transverse thereto and is roughly L-shaped when viewed with the plug on the right hand side and the transverse component upward. Safety lock lever 61 is shown in at the extreme corner of the longitudinal component of the slot away from the transverse component. When ball detent 25 drops into annular groove 53 (FIG. 6), then plug sleeve 79 snaps socket sleeve 63 to the right as seen in FIG. 9. Plug sleeve 79 is moved relative to the safety locking lever 61 as seen in FIG. 9 so that the lever is now aligned with the transverse component of slot 88. FIG. 9 shows a partial, broken away side view of the plug and socket in coaxial coupled relation.

FIG. 8 shows a partial longitudinal section of the plug and socket secured in coaxial coupled relation, as seen in FIG. 9. Socket sleeve 63 has been urged to the right as seen in FIG. 8 by the force of plug sleeve compression spring 87. Socket sleeve spring 73 is compressed. Ball detents 25 are engaged in a radially inward position by the projecting shoulder 65 on the socket sleeve 63. Annular groove 53 on the plug engages the ball detents and the plug and socket are secured in coaxial coupled relation.

FIG. 10 shows the operator actuating the safety lock lever to substantially preclude inadvertent uncoupling of the plug and socket from coaxial coupled relation. The operator simply turns the plug sleeve so that safety lock lever 61 is in the transverse portion of the slot 88 in the plug sleeve. Longitudinal movement of the plug sleeve is substantially precluded thereby, substantially preventing uncoupling of the plug and socket.

Figure 11:
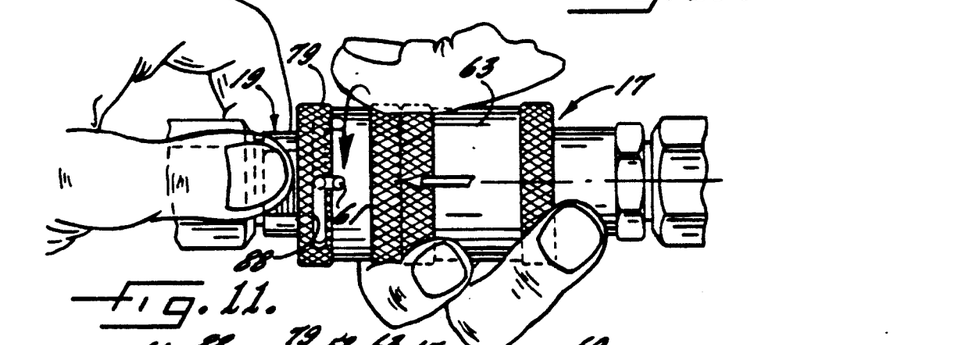
FIG. 11 is a side view of the fully assembled plug and socket of FIG. 1 and shows release of the safety lock lever and longitudinal displacement of the sleeves for disconnecting the plug and socket.

As shown in FIG. 10, and in FIGS. 7 and 11, the plug is held stationary by the operator while the plug sleeve is turned. It should be understood that either the plug or the socket may be mounted in a fixed position in a hydraulic tool or other hydraulic machinery and that the operator may then couple and uncouple the plug and socket and actuate the safety lock with one hand.

Figure 12:
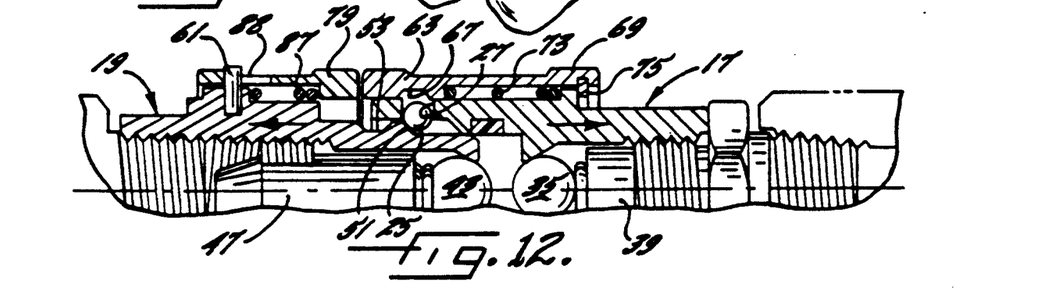
FIG. 12 is a partial longitudinal section through the coupling of FIG. 11.

FIGS. 11 and 12 show how the coupling claimed herein can be uncoupled. The operator performs substantially the reverse operation of FIG. 10 and turns the plug sleeve so that the safety lock lever occupies the longitudinal portion of the slot 88. The plug sleeve can now be moved manually to the left so that the safety lock lever occupies the extreme corner of the longitudinal component of the slot away from the transverse component and the plug is released from the socket.

The operator can move the plug sleeve against the bias of plug spring 87, move the socket sleeve, or move both to place the annular groove on socket sleeve 63 in registry with ball retaining apertures 27.

As shown in FIG. 12, with the socket sleeve 63 in registry with the ball retaining apertures 27, ramp 55 on the plug has urged the ball detents radially outward into engagement with socket sleeve annular groove 67. The force of the plug compression spring 87 and of the ball valve springs 37 and 45 urge the plug and socket to separate.

The invention claimed herein has been described with specific reference to preferred embodiments. However, variations can be made within the spirit and scope of the invention as described in the foregoing specification and defined in the appended claims. While the invention has been described with reference to preferred embodiments, it should be understood that the invention is not intended to be limited to the embodiments illustrated in the drawings, to hydraulically powered high pressure tools, or even to hydraulic fluid power systems. On the contrary, the invention includes all alternatives, modifications, and equivalents that may be included within the spirit and scope of the invention as defined by the appended claims. For example, the skilled artisan will recognize that hydraulic couplings, which are operated using liquid fluid pressure, can be adapted to pneumatic uses, which is use with a gaseous fluid, with certain modifications that are believed to be known to the skilled artisan.

That which is claimed is:

1. A quick-action fluid coupling for fluid conducting lines, characterized by push-to-connect, pull-to-disconnect features, said coupling comprising:

a generally cylindrical first member having an axial fluid flow passage therethrough and a coupling end portion;

a generally cylindrical second member having a coupling nd portion that is engagable with said coupling end portion of said first member for coaxial coupled relation between said first and second members, said second member having a corresponding axial fluid flow passage therethrough so that when said coupling end portion of said second member is engaged with said coupling end portion of said first member a single fluid flow passage is defined through said first and second members;

at least one detent carried by said first member for securing said second member in coaxial coupled relation with said first member;

means on said second member for engaging said detent when said first and second members are engaged in coaxial coupled relation;

a first sleeve carried by said first member and longitudinally movable for alternately maintaining said detent in, and releasing said detent from, engagement with said means on said second member, said first sleeve having an outer terminal end and first biasing means for longitudinally biasing said first sleeve toward said coupling end portion of said first member;

a second sleeve carried by said second member and longitudinally movable for engaging at an outer terminal end thereof said first sleeve at said outer terminal end of said first sleeve, and second biasing means for biasing said second sleeve longitudinally toward said coupling end portion of said second member so that when said second member is engaged with said first member in coaxial coupled relation, said second sleeve urges said first sleeve to hold said detent in engagement with said engaging means on said second member, thereby securing said first member and said second member in coaxial coupled relation;

and whereby said first sleeve releases said detent from said engaging means on said second member when said first sleeve is urged against said second sleeve so that said second member may be released from coaxial coupled relation with said first member.

2. The coupling of claim 1 wherein said first and second sleeves have annular abutments at said outer terminal ends for engagement to actuate said detent.

3. The coupling of claim 1 wherein said first member is a socket and said second member is a plug.

4. The coupling of claim 1 wherein said first member and said first sleeve define an annular passage therebetween for said first biasing means and said second member and said second sleeve define an annular passage therebetween for said second biasing means.

5. The coupling of claim 4 wherein said first biasing means is a relatively weaker spring and said second biasing means is a relatively stronger spring.

6. The coupling of claim 5 wherein said relatively weaker spring and said relatively stronger spring comprise helical compression springs, and wherein said relatively weaker spring is confined on the side of said detent opposite said coupling end of said first member, and said relatively stronger spring is confined on the side of said engaging means on said second member opposite said coupling end of said second member.

7. The coupling of claim 1 including seals for hydraulic fluids interposed between said first and second members substantially to preclude fluid leakage when said members are in coaxial coupled relation.

8. The coupling of claim 1 further comprising a safety lock lever for substantially precluding inadvertent release of said first and second member from coaxial coupled relation.

9. A quick-action fluid coupling for fluid conducting lines, characterized by push-to-connect, pull-to-disconnect features, said coupling comprising:
    a generally cylindrical socket having an axial fluid flow passage therethrough;
    a generally cylindrical mating plug defining a coupling end portion for being received in said socket in coaxial coupled for being received in said socket in coaxial coupled relation therewith, said socket defining a plug receiving end portion, and said mating plug having a corresponding axial fluid flow passage therethrough so that when said mating plug is received in said socket a single fluid flow passage is defined through said plug and said socket;
    a plurality of ball detents retained in ball retaining apertures defined by said socket for securing said mating plug in coaxial coupled relation with said socket;
    means on said mating plug for engaging said ball detents when said socket and said mating plug are secured in coaxial coupled engagement;
    an annular socket sleeve having an outer terminal end, said socket sleeve being carried by said socket and longitudinally movable for alternately maintaining said ball detents in and releasing said ball detents from, engagement with said means on said mating plug;
    socket sleeve biasing means for biasing said socket sleeve longitudinally toward said plug receiving end portion;
    an annular plug sleeve carried by said mating plug and being longitudinally movable for engaging at an outer terminal end thereof said outer terminal end of said socket sleeve;
    plug sleeve biasing means for biasing said socket sleeve longitudinally toward said coupling end portion of said mating plug so that when said plug is received in said socket, said plug sleeve urges said socket sleeve to hold said ball detents in engagement with said engaging means on said mating plug, thereby securing said socket and said plug in coaxial coupled relation;
    and whereby said socket sleeve releases said ball detents from said engaging means on said mating plug when said socket sleeve is urged against said plug sleeve so that said plug may be released from coaxial coupled relation with said socket.

10. The coupling of claim 9 wherein said plug sleeve and said socket sleeve have abutments at siad outer terminal ends for engagement of said sleeves.

11. The coupling of claim 9 wherein said socket and said socket sleeve define an annular passage therebetween for said socket sleeve biasing means, said plug and said plug sleeve define an annular passage therebetween for said plug sleeve biasing means, said socket sleeve biasing means is a relatively weaker helical compression spring, and said plug sleeve biasing means is a relatively stronger helical compression spring.

12. The coupling of claim 11 wherein said relatively weaker socket sleeve spring is confined on the side of said ball detents opposite said plug receiving end of said socket, and said relatively stronger plug sleeve spring is confined on the side of said engaging means on said plug opposite said coupling end of said plug.

13. The coupling of claim 12 wherein said socket sleeve further comprises:
    an annular projecting shoulder for engaging said ball detents to hold said ball detents in engagement with said engaging means on said plug for coaxial coupled relation of said plug and said socket; and
    an annular groove adjacent said projecting shoulder on the side of said projecting shoulder opposite said plug receiving end of said socket for engaging said ball detents upon receipt of said plug in said socket so that said socket sleeve is secured by said detents, said helical compression springs are compressed against each other, and when said engaging means on said mating plug comes into register with said ball retaining apertures, then said socket sleeve snaps said projecting shoulder into registry with said ball retaining apertures to hold said plug and socket in coaxial coupled relation under the bias of said relatively stronger plug sleeve spring, said annular groove also providing for releasing said ball detents from engagement with said means on said plug and withdrawing said plug from coaxial coupled relation with said socket.

14. The coupling of claim 9 wherein said coupling comprises seals for hydraulic fluids.

15. The coupling of claim 9 wherein said socket sleeve and said plug sleeve each include stop means for limiting sleeve movement in one direction.

16. The coupling of claim 9 further comprising a safety lock lever for substantially precluding inadvertent release of said plug from coaxial coupled relation with said socket, said safety lever extending radially outward from said plug, said plug sleeve having a slot through which said lever extends, said slot having a first portion extending in the same direction as the axial fluid flow passage of said plug to accommodate longitudinal movement of said plug sleeve and a second portion extending transverse to said first portion, wherein when said plug sleeve is rotated so that said safety lever is in said second portion of said slot, longitudinal movement of said plug sleeve is substantially precluded, thereby substantially precluding inadvertent release of said plug.

17. A quick-action fluid coupling for fluid conducting lines, characterized by push-to-connect, pull-to-disconnect features, said coupling comprising:
   a generally cylindrical socket having an axial fluid flow passage therethrough;
   a generally cylindrical mating plug defining a coupling end for being received in said socket in coaxial coupled relation therewith, said socket defining a plug receiving end, and said mating plug having a corresponding axial fluid flow passage therethrough so that when said mating plug is received in said socket a single fluid flow passage is defined through said plug and said socket;
   a plurality of ball detents retained in ball retaining apertures defined by said socket adjacent said plug receiving end of said socket for securing said mating plug in coaxial coupled relation with said socket, said ball detents being movable radially inwardly and outwardly with respect to said mating plug;
   an annular groove in said mating plug for engaging said ball detents when said socket and said mating plug are secured in coaxial coupled engagement;
   an annular socket sleeve carried by said socket, said socket sleeve having an annular groove for engaging said ball detents in a radially outward position and an adjacent projecting shoulder for engaging said ball detents in a radially inward position, said annular socket sleeve being longitudinally movable for alternately maintaining said ball detents in a radially inward position and for engaging said ball detents in a radially outward position, said socket sleeve and said socket defining a first passage therebetween;
   a first helical compression spring located in said first passage for biasing said socket sleeve against said socket toward said plug receiving end to provide for receipt of said ball detents in a radially outward position when said plug is inserted into said socket;
   an annular plug sleeve carried by said plug, said plug sleeve defining at one end thereof an annular end abutment for engaging said socket sleeve, said socket sleeve also defining an annular end abutment for being engaged by said plug sleeve, said plug sleeve and said plug defining a second passage therebetween;
   a second helical compression spring of greater strength than said first helical compression spring located in said second passage for biasing said plug sleeve against said plug toward said coupling end;
   first and second annular ramps on said plug for urging said ball detents radially outwardly into engagement with said annular groove on said socket sleeve as said plug is being inserted into said socket and is being removed from said socket, respectively;

said first annular ramp urging said ball detents into engagement with said annular groove in said socket sleeve as said plug is inserted into said socket to hold said socket sleeve relative to said socket as said plug sleeve engages said socket sleeve to compress said second helical compression spring, so that when said annular groove in said plug comes into registry with said ball retaining apertures, said groove on said plug receives said ball detents, said socket sleeve is released, said second helical compression spring compresses said first helical compression spring, and said socket sleeve snaps under the bias of the second helical compression spring to bring said projecting shoulder into registry with said ball retaining apertures and to secure said plug and said socket in coaxial coupled relation, said socket and said plug sleeves being movable against the bias of said second helical compression spring when said plug and said socket are held in coaxial coupled relation to bring said annular groove in said socket sleeve into registry with said ball retaining apertures, said second ramp on said plug urging said ball detents radially outwardly into engagement with said annular groove on said socket sleeve under the bias of said second compression spring, so that said socket sleeve releases said plug from said socket.

18. The coupling of claim 17 wherein said first helical compression spring is confined on the side of said ball detents opposite said plug receiving end of said socket.

19. The coupling of claim 17 wherein said second helical compression spring is confined on the side of said annular groove in said mating plug opposite said coupling end of said plug.

20. The coupling of claim 17 wherein said coupling further comprises stop means to limit movement of said socket sleeve in one direction and stop means to limit movement of said plug sleeve in one direction.

21. The coupling of claim 17 wherein said plug and said socket further comprise valves and means for biasing said valves for stopping flow through said axial flow passages when said socket and plug are not in coaxial coupled engagement, said valve means cooperating to define said single flow passage through said socket and plug when in coaxial coupled engagement, and said valve means further cooperating to urge said plug out of said socket when said plug is released from said socket.

22. The coupling of claim 21 wherein said valves and means for biasing said valves comprise stainless steel balls and compression springs seated said axial flow passages, respectively.

23. The coupling of claim 17 further comprising a safety lock lever for substantially precluding inadvertent release of said plug from coaxial coupled relation with said socket, said safety lever extending radially outward from said plug, said plug sleeve having a slot through which said lever extends, said slot having a first portion extending in the same direction as the axial fluid flow passage of said plug to accommodate longitudinal movement of said plug sleeve and a second portion extending transverse to said first portion, wherein when said plug sleeve is rotated so that said safety lever is in said second portion of said slot, longitudinal movement of said plug sleeve is substantially precluded, thereby substantially precluding inadvertent release of said plug.

24. A plug component for a quick-action fluid coupling for fluid conducting lines, the coupling being characterized by push-to-connect, pull-to-disconnect features and having a generally cylindrical socket defining a plug receiving end portion and having an axial fluid flow passage therethrough, a plurality of ball detents retained in ball retaining apertures defined by the socket for securing a plug in coaxial coupled relation with the socket, an annular socket sleeve carried by the socket and having an outer terminal end and biasing means for biasing the socket sleeve toward the plug receiving end portion of the socket, the socket sleeve being longitudinally movable for alternately maintaining the ball detents in and releasing the ball detents from, engagement with the plug, and wherein said plug component comprises:

- a generally cylindrical mating plug defining a coupling end portion for being received in the plug receiving end portion of the socket in coaxial coupled relation therewith, said mating plug having a corresponding axial fluid flow passage therethrough so that when said mating plug is received in the socket a single fluid flow passage is defined through the socket and said plug;
- means on said plug for engaging the ball detents when said plug and the socket are secured in coaxial coupled engagement;
- an annular plug sleeve carried by said plug and being longitudinally movable for engaging at an outer terminal end thereof the outer terminal end of the socket sleeve, and plug sleeve biasing means for biasing said plug sleeve longitudinally toward said coupling end portion of said mating plug so that when said plug is received in the socket, said plug sleeve urges the socket sleeve to hold the ball detents in engagement with said engaging means on said mating plug, thereby securing the socket and said plug in coaxial coupled relation;
- and whereby the socket sleeve releases the ball detents from said engaging means on said mating plug when the socket sleeve is urged against said plug sleeve so that said plug may be released from coaxial coupled relation with the socket.

25. A socket component for a quick-action fluid coupling for fluid conducting lines, the coupling being characterized by push-to-connect, pull-to-disconnect features and having a generally cylindrical mating plug defining a coupling end portion for being received in a socket, the plug having an axial fluid flow passage therethrough, means for engaging ball detents when the mating plug and socket are secured in coaxial coupled engagement, and an annular plug sleeve having an outer terminal end and plug sleeve biasing means for longitudinally biasing the plug sleeve toward the coupling end portion of the mating plug, wherein said socket component comprises:

- a generally cylindrical socket having an axial fluid flow passage therethrough, one end of said socket defining a plug receiving end portion so that when said socket and the mating plug are joined in coaxial couple relation, a single fluid flow passage is defined through the plug and said socket;
- a plurality of ball detents retained in ball retaining apertures defined by said socket for securing the mating plug in coaxial coupled relation with the socket;
- an annular socket sleeve carried by said socket and longitudinally movable for alternately maintaining said ball detents in and releasing said ball detents from engagement with the means on the mating plug, said sleeve having a terminal end and socket sleeve biasing means for biasing said socket sleeve longitudinally toward said plug receiving end portion of said socket so that when the plug is received in said socket, the plug sleeve terminal end engages said socket sleeve terminal end to urge said socket sleeve to hold said ball detents in engagement with the engaging means on the mating plug, thereby securing said socket and the plug in coaxial coupled relation;
- and whereby said socket sleeve releases said ball detents from the engaging means on the mating plug when said socket sleeve is urged against the plug sleeve so that said plug may be released from coaxial coupled relation with said socket.

26. A quick-action fluid coupling for fluid conducting lines, characterized by push-to-connect, pull-to-disconnect features, said coupling comprising:

- a generally cylindrical first member having an axial fluid flow passage therethrough and a coupling end portion;
- a generally cylindrical second member having a coupling end portion that is engagable with said coupling end portion of said first member for coaxial coupled relation between said first and second members, said second member having a corresponding axial fluid flow passage therethrough so that when said coupling end portion of said second member is engaged with said coupling end portion of said first member a single fluid flow passage is defined through said first and second members;
- at least one detent carried by said first member for securing said second member in coaxial coupled relation with said first member;
- means on said second member for engaging said detent when said first and second members are engaged in coaxial coupled relation;
- a first sleeve carried by said first member and longitudinally movable from alternately maintaining said detent in, and releasing said detent from, engagement with said means on said second member, said first sleeve having an outer terminal end and first biasing means for longitudinally biasing said first sleeve toward said coupling end portion of said first member;
- a second sleeve carried by said second member and longitudinally movable for engaging said first sleeve, said second sleeve having an outer terminal end and second biasing means for biasing said second sleeve longitudinally toward said coupling end portion of said second member so that when said second member is engaged with said first member in coaxial coupled relation, said second sleeve urges said first sleeve to hold said detent in engagement with said engaging means on said second member, thereby securing said first member and said second member in coaxial coupled relation, whereby said first sleeve releases said detent from said engaging means on said second member when said first sleeve is urged against said second sleeve so that said second member may be released from coaxial coupled relation with said first member; and
- a safety lock level for substantially precluding inadvertent release of said first and second members from coaxial coupled relation.

27. A quick-action fluid coupling for fluid conducting lines, characterized by push-to-connect, pull-to-disconnect features, said coupling comprising:

- a generally cylindrical socket having an axial fluid flow passage therethrough;
- a generally cylindrical mating plug defining a coupling end portion for being received in said socket in coaxial coupled relation therewith, said socket defining a plug receiving end portion, and said mating plug having a corresponding axial fluid flow passage therethrough so that when said mating plug is received in said socket a single fluid flow passage is defined through said plug and said socket;
- a plurality of ball detents retained in ball retaining apertures defined by said socket for securing said mating plug in coaxial coupled relation with said socket;
- means on said mating plug for engaging said ball detents when said socket and said mating plug are secured in coaxial coupled engagement;
- an annular socket sleeve carried by said socket and longitudinally movable for alternately maintaining said ball detents in and releasing said ball detents from, engagement with said means on said mating plug;
- socket sleeve biasing means for biasing said socket sleeve longitudinally toward said plug receiving end portion;
- an annular plug sleeve carried by said mating plug and being longitudinally movable for engaging said socket sleeve;
- plug sleeve biasing means for biasing said socket sleeve longitudinally toward said coupling end portion of said mating plug so that when said plug is received in said socket, said plug sleeve urges said socket sleeve to hold said ball detents in engagement with said engaging means on said mating plug, thereby securing said socket and said plug in coaxial coupled relation, whereby said socket sleeve releases said ball detents from said engaging means on said mating plug when said socket sleeve is urged against said plug sleeve so that said plug may be released from coaxial coupled relation with said socket; and
- a safety lock lever for substantially precluding inadvertent release of said plug from coaxial coupled relation with said socket, said safety lever extending radially outward from said plug, said plug sleeve having a slot through which said lever extends, said slot having a first portion extending in the same direction as the axial fluid flow passage of said plug to accommodate longitudinal movement of said plug sleeve and a second portion extending transverse to said first portion, wherein when said plug sleeve is rotated so that said safety lever is in said second portion of said slot, longitudinal movement of said plug sleeve is substantially precluded, thereby substantially precluding inadvertent release of said plug.

* * * * *

UNITED STATES PATENT AND TRADEMARK OFFICE
CERTIFICATE OF CORRECTION

PATENT NO.   :   5,255,714
DATED        :   October 26, 1993
INVENTOR(S)  :   Mullins It is certified that error appears in the above-identified patent and that said Letters Patent is hereby corrected as shown below:

Column 2, line 48, after "end" insert --portion--.

Column 6, line 18, "and" should be --end--.

Column 8, line 39, "nd" should be --end--.

Column 9, lines 48-49, delete "for being received in said socket in coaxial coupled".

Column 10, line 22, "siad" should be --said--.

Signed and Sealed this

Third Day of May, 1994

Attest:

BRUCE LEHMAN

Attesting Officer

Commissioner of Patents and Trademarks